United States Patent
Dirks et al.

(10) Patent No.: US 8,432,835 B1
(45) Date of Patent: Apr. 30, 2013

(54) SECURE VIDEOCONFERENCING EQUIPMENT SWITCHING SYSTEM AND METHOD

(75) Inventors: David H. Dirks, Livermore, CA (US); Diane Gomes, Manteca, CA (US); Corbin J. Stewart, Pleasanton, CA (US); Robert A. Fischer, Pleasanton, CA (US)

(73) Assignee: Sandia Corporation, Albuquerque, NM (US)

( * ) Notice: Subject to any disclaimer, the term of this patent is extended or adjusted under 35 U.S.C. 154(b) by 626 days.

(21) Appl. No.: 12/699,439

(22) Filed: Feb. 3, 2010

(51) Int. Cl.
*H04Q 11/00* (2006.01)

(52) U.S. Cl.
USPC ........ 370/264; 348/14.08; 370/260; 370/265; 370/351; 709/227; 709/238

(58) Field of Classification Search .... 348/14.01–14.16; 370/259–271, 351–356; 709/201–207, 217–248
See application file for complete search history.

(56) References Cited

U.S. PATENT DOCUMENTS

| 7,477,614 B2 * | 1/2009 | Hansen | 370/264 |
| 7,539,421 B2 * | 5/2009 | Winegard | 398/141 |

* cited by examiner

*Primary Examiner* — Hemant Patel
(74) *Attorney, Agent, or Firm* — Dorsey & Whitney

(57) ABSTRACT

Examples of systems described herein include videoconferencing systems having audio/visual components coupled to a codec. The codec may be configured by a control system. Communication networks having different security levels may be alternately coupled to the codec following appropriate configuration by the control system. The control system may also be coupled to the communication networks.

20 Claims, 6 Drawing Sheets

|          | Classified Mode | Isolated Mode | Unclassified Mode |
|----------|-----------------|---------------|-------------------|
| Relay 140 | Open | Open | Closed |
| Relay 142 | To network 130 | Open | To network 135 |
| Relay 144 | Open | Closed | Closed |

Figure 4

SECURE VIDEOCONFERENCING EQUIPMENT SWITCHING SYSTEM AND METHOD

STATEMENT REGARDING RESEARCH & DEVELOPMENT

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

TECHNICAL FIELD

Examples described herein relate to videoconference systems, and more particularly, to systems for switching communication networks and peripheral devices between videoconference systems.

BACKGROUND OF THE INVENTION

Videoconference systems are generally systems of equipment used to transport audio and video information. Examples of standards of communication used to transport information between videoconference systems include H.320, which defines communication via ISDN telephone communication channels and H.323, which defines communication using both UDP/IP and TCP/IP (interne) communication protocols (typically via Ethernet).

It is often important to provide videoconference facilities with communication network access matched to the security requirements of the information present in the audiovisual data. For example, two networks may be provided for communications—one with a higher level of security than the other. This is sometimes referred to as a red/black system, where the "red" network refers to the more secure network. Communications that require more security than the less stringent security available on the "black" network must be conducted over the "red" network.

One approach to providing videoconference facilities with access to several networks, each with a different security level, is simply to provide more than one of each component necessary to form the videoconference system, or a portion of the videoconference system. For example, in a common room set up for videoconferencing on two different networks—one secure, and one not secure—two of all the necessary components (cameras, microphones, cables, and the like) would be provided, with one set being used for the red network, and the other for the black network. The need to provide duplicates of all of the videoconferencing equipment adds significant cost to the system.

One approach that substantially avoids the need for duplicate components is to utilize a patch bay. The patch bay contains links to the common audio/visual peripheral components (cameras, microphones, display devices, and the like), the red network(s), the black network(s), the red videoconference system coder/decoder (codec), and the black codec. Connections are established using patch cords between groups of connectors. For example, the black codec may first be connected to the common audio/visual peripheral components (A/V components) and the black network(s), and—by moving the requisite cables—the red codec may be connected to the common A/V components and the red network(s). Such a patch bay can be expensive, and is generally inefficient, prone to error, and limited in life due to physical wear on the connectors. In the event of a configuration error, highly confidential information may be communicated on the non-secure network.

Another approach was described in U.S. Pat. No. 7,477,614, which patent is hereby incorporated by reference in its entirety for any purpose. Systems described therein include videoconferencing systems having two codecs—one for communication with a secure communication network and another with a lower security communication network. A switching system was provided to couple audio/visual components to either the secure codec, the less secure codec, or in some cases to disconnect the audio/visual components from both codecs.

BRIEF DESCRIPTION OF THE DRAWINGS

FIG. 4 is a schematic illustration of a table for use in an embodiment of the present invention.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known circuits, control signals, timing protocols, electrical components, and software operations have not been shown in detail in order to avoid unnecessarily obscuring the described embodiments of the invention.

Figure 1:
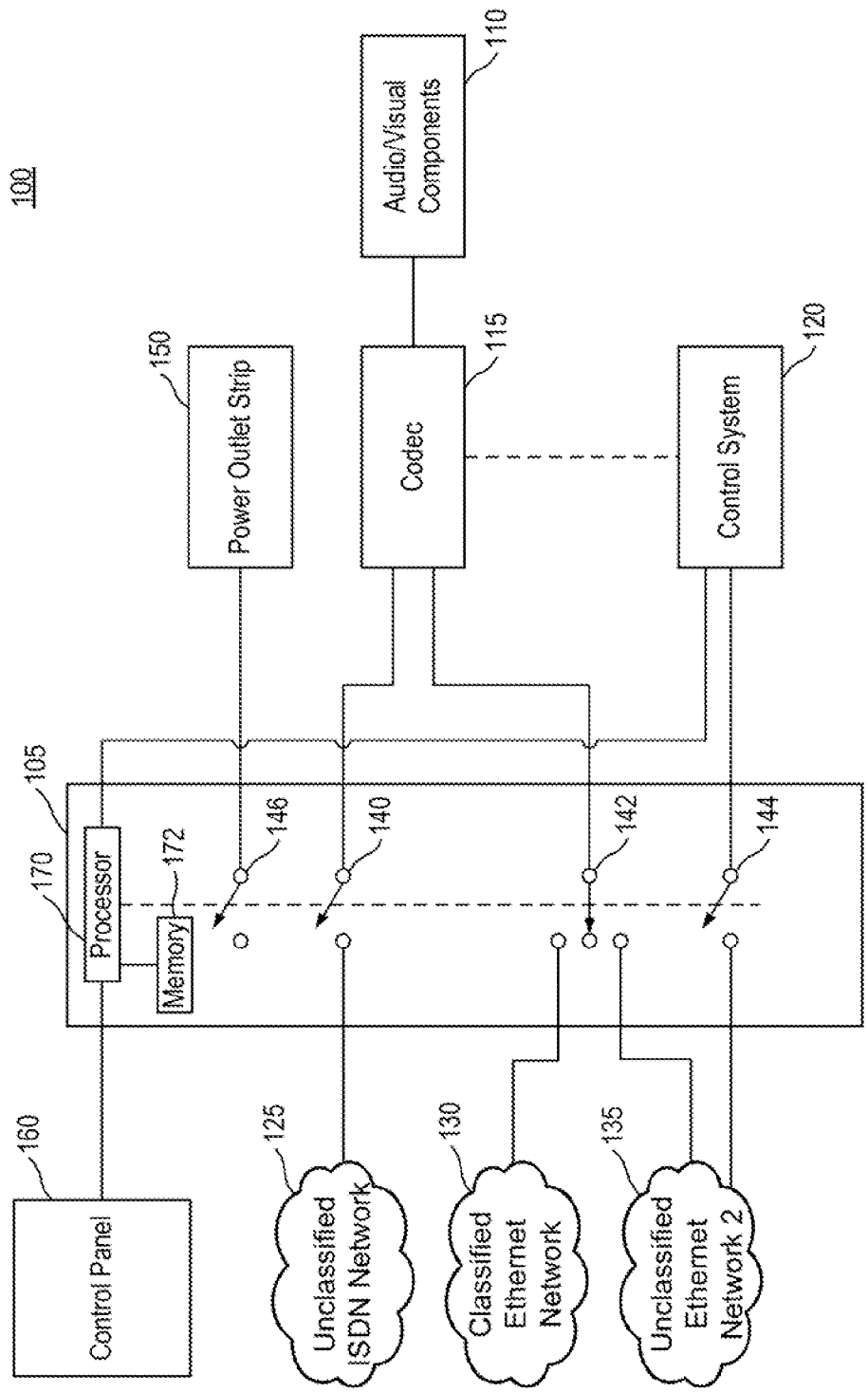
FIG. 1 is a schematic illustration of a system according to an embodiment of the present invention.

FIG. 1 is schematic illustration of a system 100 according to an embodiment of the present invention. A switching unit 105 includes an electromechanical relay network, including relays 140, 142, 144, and 146. The electromechanical relay network is provided to make connections to communication networks, the networks 125, 130, and 135 shown in FIG. 1. As will be described further below, a single codec 115 may be utilized on multiple communication networks, with the electromechanical relay network making the connections between the codec 115 and the communication networks. Audio/visual or other electrical components may be coupled to the codec 115, either directly or indirectly.

In this manner, as will be described further below, the electrical components 110 may be utilized on any of the communication networks. A control system 120 is also provided that may be connected to the communication networks, but may also have a direct connection to the codec 115. The control system 120 may configure and control the codec 115 for connection to a selected communication network.

The audio/visual components 110 may include, but are not limited to one or a plurality of: cameras, microphones, video monitors, keyboards and the like. Generally any equipment to be used to couple information, including data, to or from the codec 115 may be connected to the codec 115. The switching unit 105 functions to direct the audio, visual, data and/or control signals output from the codec 115 to one or more of the networks 125, 130, and 135, which may have different security levels. The switching unit 105 may be implemented in a variety of ways and provides isolation between secure and unsecure or less secure networks, and isolation between connected and unconnected modes.

In the embodiment of FIG. 1, the Ethernet network 135 and ISDN network 125 may be unclassified, or less secure networks, while the Ethernet network 130 may be a classified, or more secure network. The switching unit 105 may be implemented using DC actuated electromechanical relays to positively isolate signals coupled from the secure network 130 from signals coupled from the lower security network 135 and/or the lower security ISDN network 125, and in an unconnected mode to isolate the codec 115 from all the networks 125, 130, and 135. Although solid state relays may be used for portions of the switching unit 105 in some embodiments, solid state relays may not provide an actual physical disconnection and are subject to leakage and cross-talk, and therefore may not be used in some embodiments. The switching unit 105 develops two or more separate DC control signals to drive relays throughout the switching system to make or sever the connections as described herein. For example, a first DC control signal may be designated to control a "red", or higher security system, while a second DC control signal is designated to control a "black", or lower security system. The switching unit 105 is designed to prohibit more than one of the DC control signals from being energized at any given time.

In this manner, the switching unit 105 mediates communication between a single set of audio-visual components and a single codec 115 and communication networks 125, 130, and 135. The same audio-visual components may be used on the secure and less secure networks. The same codec 115 is also used in both the secure and less secure networks. The codec 115 may be implemented as known in the art, and generally provides analog-to-digital and digital-to-analog conversion. The communication networks 125, 130, and 135 are depicted as an ISDN network and Ethernet networks, respectively; however, any type and any number of different communication networks may be coupled to the switching unit 105 for connection to the codec 115. Further, the switching unit 105 may be connected to any number of codecs and similarly switch additional codecs between available networks.

As described above, the switching unit 105 may be implemented using electromechanical relays. The relay 140 connects and disconnects the codec 115 from the ISDN network 125. The relay 142 has three additional positions for the codec 115—connected to the Ethernet network 130, the Ethernet network 135, and disconnected from both Ethernet networks 130 and 135.

Utilizing a single codec 115 to couple signals from the audio/visual components 110 to and from selected ones of the networks 125, 130, and 135, may present challenges. In particular, it may not be desirable to have information stored in the codec 115 while the codec 115 is coupled to the classified network 130 to leak to the unclassified networks 125 or 135 when the codec 115 is later coupled to an unclassified network. Accordingly, in some embodiments a control system 120 is provided that may control operation of the codec 115, and particularly, provide a control signal to the codec 115 when appropriate to reboot the codec 115, load and erase configuration files from the codec 115, or load or erase memory of the codec 115. The control system 120 will be described further below and may also be used to advantageously control other components in the system, or provide diagnostics. Accordingly, the control system 120 may in some embodiments only be connected to a lower security or unclassified network, such as the Ethernet network 135 of FIG. 1. By allowing connection only to a lower security or unclassified communication network, the control system 120 may advantageously be prevented from altering the system while it is connected to a classified or higher security network, such as the network 130 of FIG. 1.

A relay 146 is also provided in the switching unit 105 to couple one or more power outlets 150 to other connected components. The relay 146 may also allow power to be disconnected from all components coupled to the switching unit 105. In some embodiments, the relay 146 may control power to classified, or higher security components, and may allow power to be decoupled from classified components when the unclassified networks are being used.

Control of the relays in the switching unit 105 will be described further below; however, in FIG. 1, a control panel 160 is shown that may provide a control signal to the switching unit 105 indicative of a mode in which to operate. Each of the relays is then latched in a position dictated by the mode. As will be described further below, the switching unit 105 may also include a processor 170 and memory 172. The processor 170 may receive the control signal indicative of a mode from the control panel 160. The memory 172 may store relay settings corresponding to each mode. The processor 170 may access the relay settings stored in the memory 172 and provide corresponding control signals to the relays. The processor 170 may also be coupled to the control system 120. The processor 170 may provide an indication of a selected mode to the control system 120 which may control the codec 115 in accordance with the selected mode, as will be described further below. The control system 120 may also communicate with the processor 170, memory 172, or both, to reconfigure, delete, or add modes and corresponding relay settings stored in the memory 172.

Figure 2:
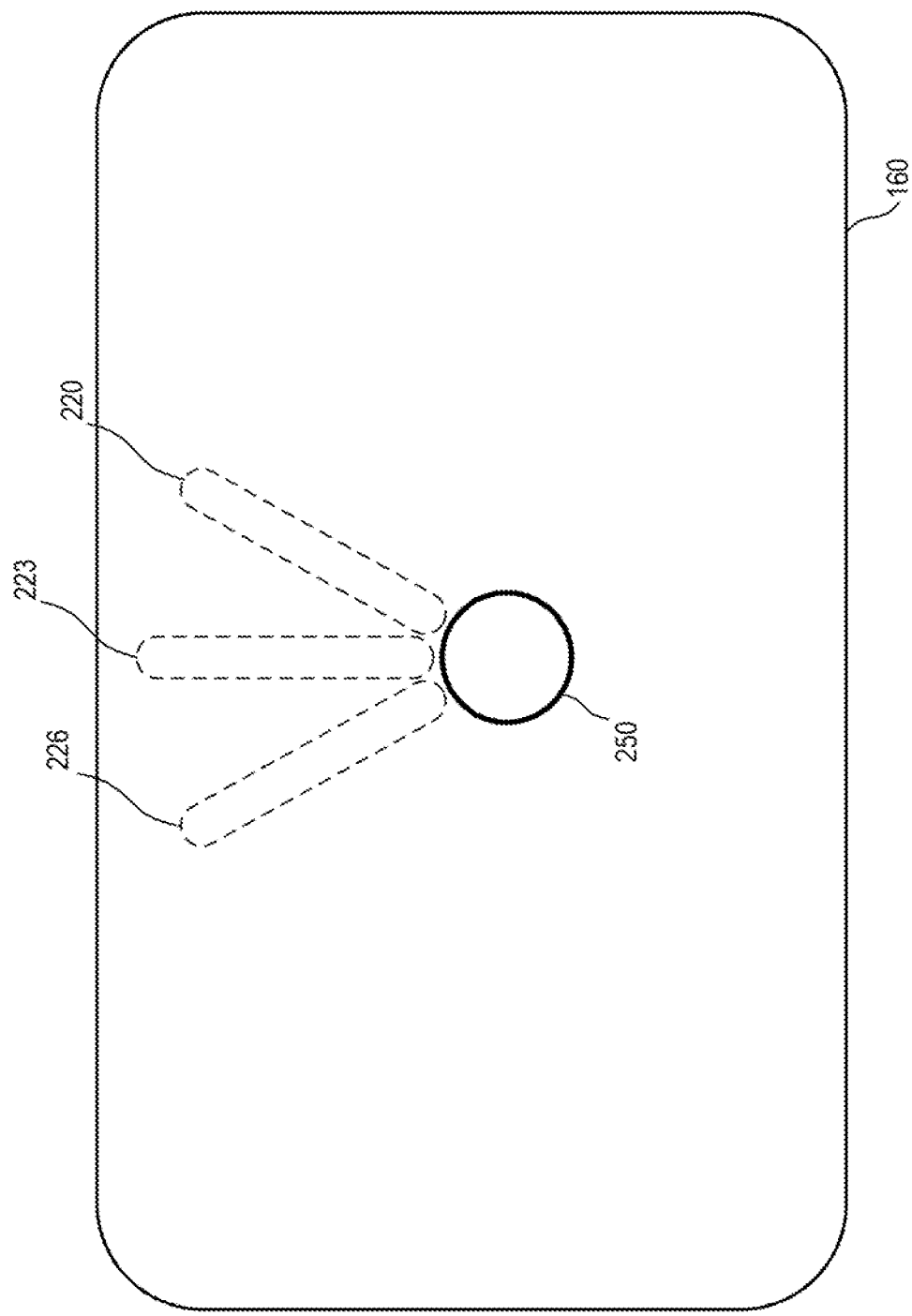
FIG. 2 is a schematic illustration of a control panel according to an embodiment of the present invention.

FIG. 2 depicts an embodiment of the control panel 160 of FIG. 1. The embodiment of the control panel 160 shown in FIG. 2 is a manual control panel having an interface 250. The interface 250 shown in FIG. 2 may be a key actuated rotary switch operable to be in one of three positions 220, 223, and 226. The position 226 indicates that the more secure ("red") videoconference system is being accessed, such as the classified Ethernet network 130 of FIG. 1. The position 220 indicates that a less secure ("black") videoconference system is being accessed, such as the unclassified Ethernet network 135 or the unclassified ISDN network 125, or both, of FIG. 1. The position 223 indicates that the codec 115 is disconnected and isolated from both the classified and unclassified Ethernet networks shown in FIG. 1. In some embodiments, following unclassified or "black" use of the system, the control panel must pass through the isolated or disconnected position before being placed in the classified or "red" position. Various colored lights may accompany the key turn positions for a clear visual indication of the system status, if desired. Although only three positions 220, 223, 226 are shown in FIG. 2 it is to be understood that more may be used in other embodiments, depending on the number of videoconference systems or communication networks accessible to the switching unit 105.

Although embodiments of systems, control panels, and switching units are described herein in terms of three operational modes, it is to be understood that generally any number of modes may be implemented with a corresponding number of relay configurations. In some instances, one or more modes may have a same relay configuration.

Figure 3:
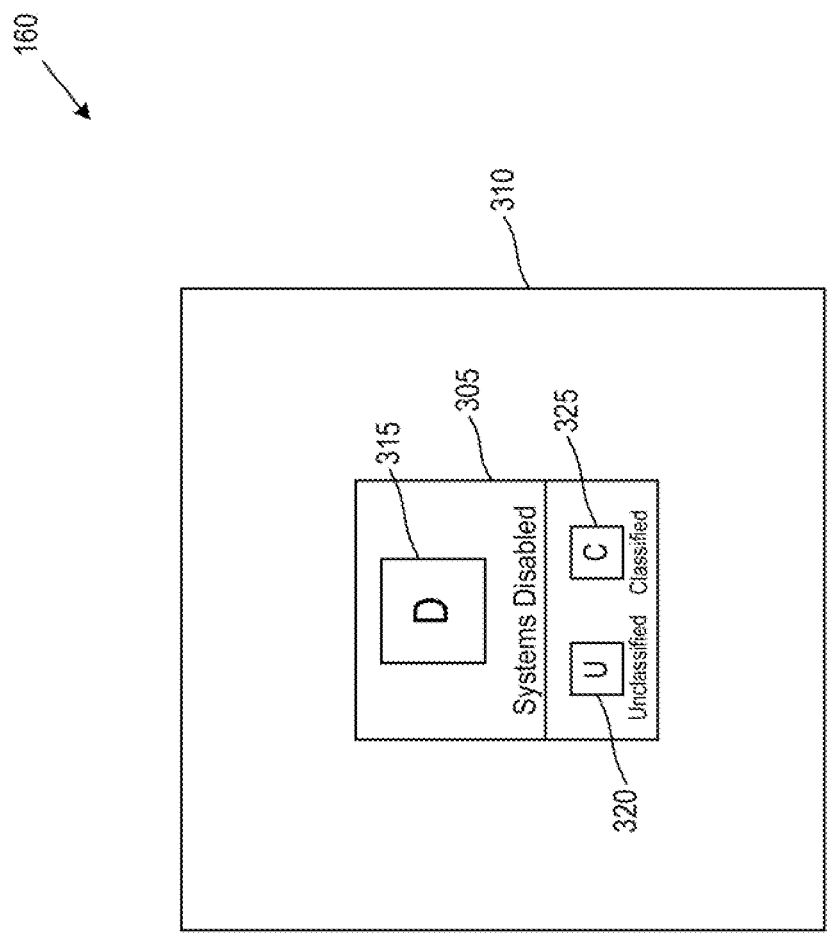
FIG. 3 is a schematic illustration of a control panel according to another embodiment of the present invention.

In some embodiments, the control panel 160 of FIG. 1 may be implemented as a remote control panel. An embodiment of the control panel 160 of FIG. 1 implemented as a remote control panel is shown in FIG. 3. The control panel 160 of FIG. 3 is implemented using a touch panel LCD display 305 mounted in a wall box 310 that may be mounted, for example, in a standard room light switch location. The LCD display 305 provides an indication of a current state at a location 315. In the example of FIG. 3, the current state is shown as "D" for a disabled state, indicating neither the classified nor the unclassified Ethernet network is connected to the codec 115 of FIG. 1. Other settings are displayed in locations 320 and 325 in FIG. 3—namely the "U" unclassified selection and "C" classified selection, described above with reference to positions 226 and 220 of the manual control switch of FIG. 2. In the embodiment of FIG. 3, however, the states are selected by touching the option on the LCD display 305. In this manner, the switching unit 105 may be controlled remotely from an easily accessible room location. In some embodiments, the remote control panel 160 of FIG. 3 may require a secure user login prior to activation or presenting the "C" classified option. In some embodiments, following unclassified or "black" use of the system, an operator must select the isolated or disconnected position before being allowed to select the classified or "red" position. In some embodiments, the user may select the classified position after unclassified, and the system will automatically first enter the disabled or isolated state followed by transfer to the unclassified state.

A summary of the operation of the switching unit 105 of FIG. 1 will now be described with reference to FIG. 4. FIG. 4 is a table showing position of the relays 140, 142, and 144 in each of three modes—classified, isolated, and unclassified. Recall these modes can be accessed with positions 226, 223, and 220, respectively of the manual control panel of FIG. 2, or with options 325, 315, and 320, or the remote control panel of FIG. 3. If classified mode is selected, the control panel 160 sends a control signal to the switching unit 105 indicating classified mode is selected. The switching unit then develops appropriate control signals for the relays 140, 142, and 144. As indicated in FIG. 4, relay 140 will be open, relay 142 will be connected to network 130, and the relay 144 will be open. In this manner, the classified network 130 is coupled to the codec 115 and the unclassified networks 125 and 135 are isolated from the codec 115. Additionally, the control system 120 is isolated from the unclassified network 135.

In the isolated mode, the control panel 160 sends a control signal to the switching unit 105 indicative of isolated mode. The switching unit 105 then develops control signals for the relays 140, 142, and 144. As shown in FIG. 4, the relays 140 and 142 will be open, while the relay 144 will be closed. In this manner, the classified and unclassified networks are isolated from the codec 115; however, the control system 120 may still be coupled to the unclassified network 135 for diagnostic or other purposes.

In the unclassified mode, the control panel 160 sends a control signal to the switching unit 105 indicative of unclassified mode. The switching unit 105 then develops control signals for the relays 140, 142, and 144. As shown in FIG. 4, the relays 140 and 144 will be closed, and the relay 142 connected to the network 135. In this manner, the unclassified networks 125 and 135 are coupled to the codec 115 and the control system 120 is also coupled to the unclassified network 135.

Note that in all three modes, a connection may be maintained between the control system 120 and the codec 115. In some embodiments, the connection between the control system 120 and the codec 115 may be implemented with an RS232 interface; however, other interfaces may be used. The control system 120 may accordingly control codec 115 operation in any of the modes, and provide diagnostic or other metrics over multiple modes of codec operation.

The description above with reference to FIG. 4 describes the final position of the relays 140, 142, and 144 in each of the three described modes. However, as has been described above, in some embodiments, additional steps may be taken to ensure information stored in the codec 115 during classified operation is not accessible to unclassified networks. Accordingly, configuration of the codec will now be described for transitions between the three modes described above.

In the isolated or disabled mode, the codec 115 is powered off. Referring to FIG. 1, in some embodiments the codec 115 may be powered off by receiving a control signal indicative of power down from the control system 120. That is, a signal indicative of the disabled mode may be provided to the processor 170, which then provides a signal to the control system 120 indicative of disabled mode. Responsive to the indication of disabled mode, the control system 120 may provide a signal to the codec 115 to power down.

When transitioning from isolated or disabled state to unclassified mode, the codec 115 may simply be powered on prior to or simultaneously with connecting the networks 125 and 135 to the codec 115. The control system 120 may receive an indication of unclassified mode from the processor 170, and responsive to the indication of unclassified mode, provide a signal to the codec 115 to power on.

When transitioning from disabled to classified mode, the codec 115 is also powered on as described above. However, the codec 115 may also be configured for classified communications, and then rebooted. That is, the control system 120 may receive an indication of classified mode from the processor 170. Responsive to the indication of classified mode, the control system 120 may configure the codec for classified communication. The configuration may include a variety of configuration procedures. For example, a configuration file suitable for use in communicating over the classified network 130 may be stored in the control system 120. The configuration file may be loaded into the codec 115 responsive to an indication of classified mode. The control system 120 may also erase or reset memory associated with the codec 115 as part of configuring the codec for classified communications. This may include erasing or resetting unclassified network information from the codec 115 and loading the classified network information, such as IP addresses, subnet mask, and DNS information. Following configuration for classified communication, the control system 120 may reboot the codec 115. The control system 120 may check that the codec 115 has been rebooted and configured for classified communication. Following the check, the control system 120 may provide an indication to the processor 170 that the codec 115 is configured for classified communication. Responsive to the indication the codec 115 is configured for classified communication, the processor 170 may provide control signals to the relays to couple the classified network 130 to the codec 115. Accordingly, the transition of the relay 142 to the classified network 130 may be delayed until after the codec 115 has been configured for classified communication and rebooted.

When transitioning from an unclassified to an isolated or disabled mode, the control system 120 powers the codec 115 off.

When transitioning from a classified to an isolated or disabled mode, the control system 120 receives an indication from the processor 170 of the disabled mode. Responsive to the indication of the transition from the classified to the disabled mode, the control system 120 may delete or otherwise reset memory associated with the codec 115 to remove any possibly classified data and network settings. The classified configuration file loaded in the codec 115 may be removed and stored in the control system 120. The control system may reboot the codec 115.

When transitioning from classified, through isolated or disabled, to unclassified, the codec 115 is disconnected from the communication networks as in the disabled state. A similar process as described above with respect to the transition from classified to disabled mode may be performed. The codec may be rebooted prior to connection to the unclassified networks. The control system 120 may provide an indication to the processor 170 that the codec 115 has been rebooted and cleared for unclassified communication. Following an indication that the codec 115 is configured for unclassified communication, the processor 170 may provide the control signals to couple the unclassified networks to the codec 115. That is, processor 170 may decouple the codec 115 from the networks as described above for transition to the disabled state, but the control signals to couple the unsecure network to the codec 115 may be delayed until the control system 120 provides an indication that the codec 115 has been configured for unclassified communication. It may not be necessary to power down the codec, as is typically done in isolated or disabled mode.

When transitioning from unclassified, through isolated or disabled, to classified, the codec 115 is disconnected from the communication networks, configured to classified mode as described above, and rebooted, prior to connection to the classified network 130. It may not be necessary to power down the codec, as is typically done in isolated or disabled mode.

Having described a general configuration of a switching unit and videoconferencing system according to embodiments of the present invention, a more detailed description of embodiments of the switching unit and operation of the switching unit will now be described.

Figure 5:
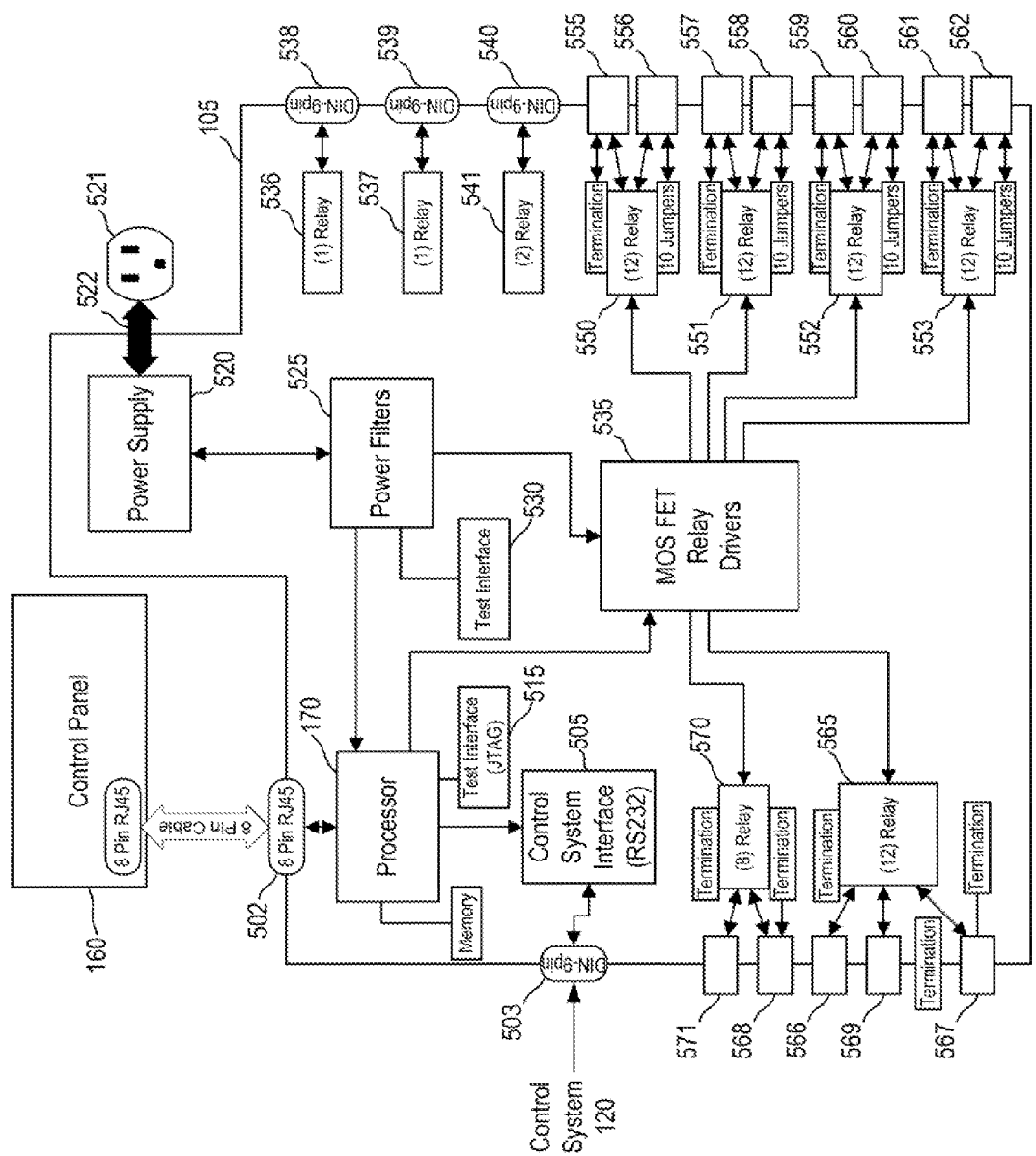
FIG. 5 is a schematic illustration of a switching unit according to an embodiment of the present invention.

FIG. 5 is a schematic illustration of an implementation of the switching unit 105. The control panel 160 may be connected to an RJ45 interface 502 of the switching unit 105. Although an RJ45 interface to the control panel 160 is shown, other interfaces may also be implemented. The control system 120 of FIG. 1 may be connected to the switching unit 105 using a DIN 9-pin interface 503. The control system 120 may communicate using an RS232 protocol to a control system interface 505 of the switching unit 105. The control system interface 505 may communicate signals between the control system 120 and the processor 170. The processor 170 and memory 172 may receive signals from the control panel 160 and control system interface 505, as shown. Any suitable processors and memory may be used, and although only a single box for each is shown in FIGS. 1 and 5, any number may be present. The processor 170 may also have a test interface 515, which may be implemented as a standard JTAG interface. This allows for testing and confirmation of the operation of the processor 170 and diagnostics for the switching unit 105.

A power supply 520 may also be provided in the switching unit 105 coupled to a power source 521 through a power source interface 522. The power supply 520 may convert 110V/220V supplied power to +3 or +5 or +12V DC power for use by the relay drivers, described below. Power filters 525 may also be provided, along with power regulators and fuse protection, as desired. The power filters 525 may also have a test interface 530.

Relay drivers 535 are provided coupled to the processor 170. The processor 170 provides control signals to the relay drivers to set the relays using DC control signals, as has been described above, developed based on the power supplied by the power supply 520 and filters 525. The processor may receive an indication of a selected mode from the control panel 160, access stored relay settings in the memory 172 corresponding to the selected mode, and provide signals to the relay drivers 535 to achieve the relay settings for the selected mode.

The relays shown in FIG. 5 will now be described with reference to FIG. 1. The relays 536 and 537 provide connection to power supplies for black, or less secure, and red, or more secure, electrical components, respectively, over the DIN 9-pin interfaces 538 and 539. A general purpose input/output (GPIO) interface 540 may also be provided along with GPIO relays 541 to connect with legacy components.

The switching unit 105 of FIG. 5 is shown configured for possible connection with up to four ISDN networks. There are four sets of relays 550-553 shown. The relays 550 are configured to couple and decouple the codec interface 555 with the ISDN interface 556. So, for example, the ISDN connection of the codec 115 of FIG. 1 may be coupled to the codec interface 555 of the switching unit 105, and the ISDN network 125 may be coupled to the ISDN interface 556. The relays 550 may then serve the function of relay 140 described in FIG. 1. The relays 551, 552, and 553, make similar connections between the additional codec and ISDN interfaces shown. Each set of relays may further include appropriate terminations, and jumpers may be included as well to reconfigure the RJ45 interfaces into interfaces compatible with other standards.

The relays 565 are provided to couple an Ethernet interface 569 to a connected codec, such as an Ethernet interface of the codec 115 of FIG. 1, to either of two Ethernet networks, as has been described above. A first network is available at Ethernet interface 566 and the second at Ethernet interface 567. So for example, the relays 565 may include the relay 142 of FIG. 1 and the interface 566 may be coupled to the Ethernet network 135 while the interface 567 is coupled to the Ethernet network 130.

Finally, relays 570 are provided to couple another interface 571 to a control system to another Ethernet interface to the unclassified Ethernet network 135. Recall from above that separate interfaces to the unclassified Ethernet network 135 may be used to maintain a connection between the unclassified Ethernet network 135 and the control system 120 while the codec 115 is unconnected from the unclassified Ethernet network 135 in disable mode. So, for example, the relays 570 may include the relay 144 of FIG. 1. By having separate sets of relays 570 and 565, note that a connection to unsecured Ethernet network 135 may be severed from the codec 115 by disconnecting the relays 565, but maintained with the control system through the relays 570. This may allow for continued reporting of metrics and other diagnostic information when the system is in an isolated mode, by isolating the codec 115, but allowing, the connection between the control system and the Ethernet network 135 in disabled mode.

An example of operation of the switching unit 105 will now be described. The memory 172 may store relay settings corresponding to the various modes available to the switching unit 105. For example, a table similar to the table shown in FIG. 4 may be stored in the memory 172. A signal indicative of a mode, such as 'classified' mode, is provided by the control panel to the processor 170. The processor is configured to look-up the relay settings associated with the mode and couple one or more control signals to the relay drivers 535 to place the relays in the switching unit 105 in the positions indicated in the table. The processor 170 and memory 172 may implement their functionality in hardware, software, firmware, or combinations thereof.

At startup, or at other times during operation, the processor 170 may test the relays by sensing current and voltage through the relay drivers 535. If test results indicate the relays are in positions other than those indicated by the table entries for the present mode, the processor 170 may provide control signals to the control system 120, the relay drivers 535, and/or other components to shut the system down, by, for example, disconnecting the power, or disconnecting relays. In this manner, failure of one or more relays may be detected and the system protected in the event of relay or control failure.

As has been described above, the relay settings for each mode may be stored in the memory 172. The modes and relay settings may be added, deleted, or changed by a control system through the control system interface 505. The control system may also make changes remotely when the relays 570 allow communication between the control system and an Ethernet communication network. Additionally, the control system may make metrics available over the Ethernet network 135, such as room usage metrics. In this manner, the metrics data may be retrieved anywhere accessible to the Ethernet network 135.

Figure 6:
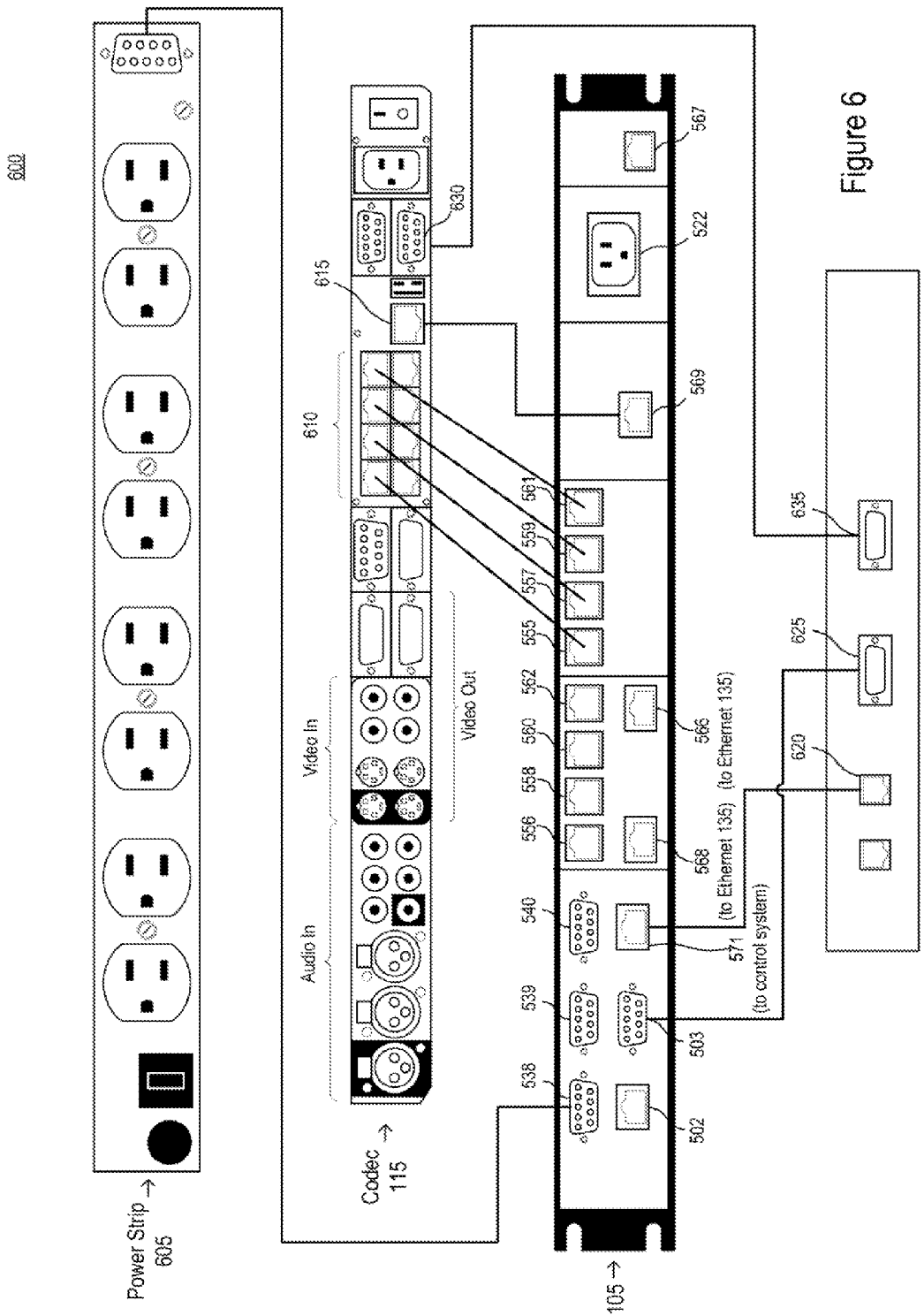
FIG. 6 is a schematic illustration of a system according to an embodiment of the present invention.

A schematic illustration of a system 600 according to an embodiment of the present invention is shown in FIG. 6. A rear view of several components is shown, to provide a view of their electrical connections. The components shown in FIG. 6 may be mounted together in standard computer racking equipment, or may be located separately. The codec 115, switching unit 105, and control system 120 are shown. The control system 120 may include its own processor and memory, and may have connected input/output devices. Also shown is a power strip 605. Interconnections between the components will now be described.

The power strip 605 may be plugged into any of a variety of "black" or unsecure or less secure components. This may include, for example, computers, audio/visual equipment including, for example, displays, monitors, cameras, microphones. The power strip 605 is connected to the "black power" interface 538 of the switching unit 105. In this manner, the power strip 605 may be energized when the switching unit 105 closes the relay to the black power control 538. Another power strip, a "red" or more secure or classified power strip may also be provided (although not shown in FIG. 6). The classified power strip may be plugged into classified components, such as classified or "red" computers. The classified power strip may be coupled to the "red power" interface 539 of the switching unit 105 to allow power to the classified components when the switching unit 105 closes a relay to the red power interface 539.

Interfaces of the codec 115 are shown in FIG. 6. As shown, the interfaces may include audio and video input and output ports. The signal lines of audio/visual or other electrical components may be coupled to the codec 115. The components may include, for example, computers, displays, cameras, microphones, DVD players, or other signal sources or receivers. The codec 115 may communicate signals between the audio and visual input and output ports and ISDN connections 610 or IP connection 615 of the codec 115. Accordingly, the ISDN connections 610 are coupled to respective ones of the switching unit interfaces 555, 557, 559 and 561 as shown. Similarly, the IP interface 615 of the codec is coupled to an IP interface 569 of the switching unit 105. The switching unit may control which networks are made available at the interfaces 555, 557, 559, 561 and 569. In this manner, the switching unit 105 controls the networks coupled to the codec 115.

A rear view of the switching unit 105 is shown in FIG. 6 to illustrate the electrical interfaces. The black power interface 538 and red power interface 539 may be coupled to red and black power strips. The GPIO interface 540 may be coupled to legacy components communicating over general purpose 110. The control panel 160 (not shown in FIG. 6) may be coupled to the switching unit at the interface 502. The control system 120 may be coupled to the switching unit at the interfaces 503 and 571. The two interfaces, as described above, may allow the switching unit 105 to connect and disconnect an Ethernet network to the interface 571 while maintaining a control connection to the control system 120 through the interface 503. ISDN networks are coupled to the interfaces 556, 558, 560 and 562. The switching unit 105 may control the coupling of these networks to the codec interfaces at 555, 557, 559 and 561. The unclassified Ethernet network 135 is coupled to the switching unit at interfaces 566 and 568. The interface 568 may be used by the switching unit 105 to connect and disconnect the control system 120 from the Ethernet network 135, through the interface 571. The interface 566 may independently be used by the switching unit to connect and disconnect the codec 115 from the Ethernet network 135, through the interface 569. Power is coupled to the switching unit 105 at the interface 522. Classified Ethernet network 130 is coupled to the switching unit 105 at the interface 567. The switching unit 105 may couple the classified network to the codec 115 through the interface 569. Note that the classified Ethernet network 130 is spaced from the interface 569, in some embodiments by at least two inches, to maintain isolation between the classified Ethernet network 130 and the unclassified Ethernet network 125 when the unclassified Ethernet network is connected to the interface 569.

Interfaces to the control system 120 are also shown in FIG. 6. Although not shown in FIG. 6, the control system 120 may include a processing unit and memory. The memory may store configuration files to be loaded into the codec 115 for different modes of communication, as generally described above. The processor may be configured to perform diagnostics and control the codec 115. Input and output devices may also be coupled to the control system 120 for administration of the control system 120 and for viewing or storing diagnostic information.

The control system 120 may be coupled to the switching unit 105 using the interface 571 of the switching unit coupled to an interface 620 of the control system 120. The control system 120 may also be coupled to the switching unit 105 over an RS-232 connection between the interface 503 and 625. A direct connection between the codec 115 and the control system 120 may be made between an interface 630 of the codec 115 and an interface 635 of the control system 120. In this manner, a connection between the codec 115 and the control system 120 may be maintained independent of the switching unit 105 in some embodiments. So, for example, the control system 120 may control the codec 115 including rebooting the codec 115, or loading or removing configuration files from the codec 115, using the connection between the interfaces 630 and 635, responsive to an indication of a desired mode received by the control system 120 from the switching unit 105, as has been described above.

Embodiments of the switching unit 105 may advantageously be supplied in a 1 rack unit (1 RU) configuration having a height of 1 and ¾ inches. The compact configuration of the switching unit 105 advantageously may save space in computing rack. A dense printed circuit board may be used to provide the interconnections within the switching unit. In particular, in some embodiments, a twelve-layer printed circuit board may be used to provide many planes and reduce the overall space required by the switching unit 105. In some embodiments, two printed circuit boards may be used, a motherboard configured to provide Ethernet, power, and control connectivity, and a daughterboard configured to provide ISDN connectivity. The daughterboard may be placed above or below the motherboard.

The switching unit 105 may meet stringent isolation requirements between outputs. Some embodiments may provide isolation in excess of 50 dB at frequencies associated with high speed Ethernet and ISDN. Several aspects of the design of the switching unit 105 may contribute to the isolation performance. The relays may be selected for achieving hi-isolation between contacts that are not in the signal path. When the relay is in the normally closed mode, the normally open contacts have very low cross-talk with the normally closed contacts. The printed circuit boards may be designed to provide maximum signal isolation and minimize crosstalk between signal lines. In particular, as described above, a multi-layer printed circuit board, such as a twelve layer board, may be used where every signal type uses an entire plane and an associated ground plane. The signal may be therefore considered encapsulated similar to a coaxial transmission line. Grounds for the various signal types may not be interconnected with each other with "via" holes. Maintaining separate ground planes for the signal types may also improve the isolation. All PCB ground planes may then be grounded at one common location.

From the foregoing it will be appreciated that, although specific embodiments of the invention have been described herein for purposes of illustration, various modifications may be made without deviating from the spirit and scope of the invention.

What is claimed is:

1. A system for switching electrical components, the system comprising:
    a codec coupled to the electrical components and configured to receive audio, visual, or both types of signals from the electrical components;
    a control system coupled to the codec and configured to control the codec;
    a control panel configured to generate a signal indicative of a selected mode for the system;
    a switching unit coupled to the codec, control system, and control panel, the switching unit comprising:
        a memory encoded with a relay configuration associated with a plurality of modes for the system, including the selected mode;
        a processor coupled to the control panel and the memory, the processor configured to receive the indication of the selected mode, access the relay configuration stored in the memory associated with the selected mode, and generate relay control signals based, at least in part, on the relay configuration;
        a first interface to a first Ethernet network having a first security level;
        a second interface to the first Ethernet network having the first security level;
        a third interface to a second Ethernet network having a second security level;
        at least a first electromechanical relay coupled between the codec, the first interface to the first Ethernet network, and the third interface to the second Ethernet network, the first electromechanical relay further coupled to the processor and configured to disconnect the codec, or couple the codec to the first interface, or couple the codec to the third interface based on a relay control signal received from the processor;
        at least a second electromechanical relay coupled between the control system and the second interface to the first Ethernet network having the first security level, the second electromechanical relay coupled to the processor and configured to disconnect the control system from or couple the control system to the second interface based on a relay control signal received from the processor; and
    wherein:
        when the selected mode is a first mode, the relay configuration corresponds to the first electromechanical relay forming a connection between the codec and the first interface to the first Ethernet network and the second electromechanical relay forming a connection between the control system and the second interface to the first Ethernet network;
        when the selected mode is a second mode, the relay configuration corresponds to the first electromechanical relay disconnecting the codec from the first and third interfaces and the second electromechanical relay connecting the control system to the second interface; and
        when the selected mode is a third mode, the relay configuration corresponds to the first electromechanical relay connecting the codec to the third interface and the second electromechanical relay disconnecting the control system from the second interface.

2. The system of claim 1, wherein the processor is further configured to test the first and second relays prior to operation of the system, and wherein the processor is configured to disable the system if a result of the test indicates at least one of the first and second relays are not configured in accordance with the relay configuration for the selected mode.

3. The system of claim 1, wherein the first mode comprises a less secure mode, the second mode comprises a disabled mode, and the third mode comprises a more secure mode, and wherein the first security level comprises an unclassified security level and wherein the second security level comprises a classified security level.

4. The system of claim 1, wherein the control panel comprises a touch screen Liquid Crystal Display (LCD), display.

5. The system of claim 1, wherein the switching unit is disposed within a 1 Rack Unit (RU) rack space.

6. The system of claim 1, wherein the processor is further coupled to the control system, and wherein the control system is configured to receive an indication of the selected mode and configure the codec in accordance with the selected mode.

7. The system of claim 6, wherein the selected mode comprises the third mode and wherein the control system is configured to configure the codec for classified communication prior to the processor coupling the relay control signals to the first and second relays.

8. The system of claim 7, wherein the control system is configured to load a classified communication configuration file into the codec and reboot the codec prior to the processor coupling the relay control signals to the first and second relays.

9. The system of claim 6, wherein the selected mode comprises the first mode and wherein the control system is configured to erase a memory of the codec and reboot the codec prior to the processor coupling the relay control signals to the first and second relays.

10. The system of claim 1, wherein the switching unit further comprises:
    a fourth interface to an Integrated Services Digital Network (ISDN) network having the first security level; and at least a third electromechanical relay coupled between the fourth interface and the codec; and wherein when the selected mode is the first mode, the relay configuration corresponds to the third electromechanical relay forming a connection between the codec and the ISDN network;

when the selected mode is the second mode, the relay configuration corresponds to the third electromechanical relay disconnecting the codec from the fourth interface; and when the selected mode is the third mode, the relay configuration corresponds to the third electromechanical relay disconnecting the codec from the fourth interface.

11. A method of utilizing electrical components on classified and unclassified communication networks, the method comprising:

receiving, at a processor, a signal indicative of a selected mode for the system;

accessing a relay configuration stored in a memory corresponding to the selected mode;

controlling a plurality of electromechanical relays in accordance with the relay configuration corresponding to the selected mode, wherein:

when the selected mode is a first mode, the relay configuration corresponds to a first electromechanical relay forming a connection between a codec and a first interface to a first Ethernet network having a first security level, wherein the codec is coupled to the electrical components, and wherein the relay configuration further corresponds to a second electromechanical relay forming a connection between a control system and a second interface to the first Ethernet network;

when the selected mode is a second mode, the relay configuration corresponds to the first electromechanical relay disconnecting the codec from the first interface and from a second Ethernet network having a second security level, and the second electromechanical relay connecting the control system to a second interface to the first Ethernet network; and when the selected mode is a third mode, the relay configuration corresponds to the first electromechanical relay connecting the codec to the second Ethernet network having the second security level and the second electromechanical relay disconnecting the control system from the second interface; and controlling a codec with the control system in accordance with the selected mode, wherein when the selected mode comprises the third mode, configuring the codec for communication with the second Ethernet network having the second security level prior to coupling the second Ethernet network to the codec with the first electromechanical relay; and when the selected mode comprises the first mode, configuring the codec for communication with the first Ethernet network having the first security level and rebooting the codec prior to coupling the first Ethernet network to the codec.

12. The method of claim 11, further comprising testing the first and second relays prior to operation of the system, and disabling the system if a result of the test indicates at least one of the first and second relays are not configured in accordance with the relay configuration for the selected mode.

13. The method of claim 11, wherein the first mode comprises a less secure more, the second mode comprises a disabled mode, and the third mode comprises a more secure mode, and wherein the first security level comprises an unclassified security level and wherein the second security level comprises a classified security level.

14. The method of claim 11, wherein the configuring the codec for communication with the first or second Ethernet networks comprises loading a respective configuration file into the codec and rebooting the codec.

15. The method of claim 11, wherein the selected mode comprises the first mode and wherein controlling the codec further comprises erasing a memory of the codec prior coupling the codec to the first Ethernet network.

16. The method of claim 1, wherein the controlling the plurality of electromechanical relays further comprises:

a fourth interface to an ISDN network having the first security level; and at least a third electromechanical relay coupled between the fourth interface and the codec; and wherein when the selected mode is the first mode, controlling a third electromechanical relay to form a connection between the codec and an ISDN network having the first security level;

when the selected mode is the second mode, disconnecting the codec from the ISDN network; and when the selected mode is the third mode, disconnecting the codec from the ISDN network.

17. The method of claim 1, further comprising maintaining a connection between the codec and the control system during all of the first, second, and third modes.

18. A switching unit comprising:

a memory encoded with a relay configuration associated with a plurality of modes for a system;

a processor configured to couple to a control panel and the memory, the processor configured to receive an indication of a selected mode, access the relay configuration stored in the memory associated with the selected mode, and generate relay control signals based, at least in part, on the relay configuration;

a first interface to a first Ethernet network having a first security level;

a second interface to the first Ethernet network having the first security level;

a third interface to a second Ethernet network having a second security level;

at least a first electromechanical relay configured to couple between a codec, the first interface to the first Ethernet network, and the third interface to the second Ethernet network, the first electromechanical relay further coupled to the processor and configured to disconnect the codec, or couple the codec to the first interface, or couple the codec to the third interface based on a relay control signal received from the processor;

at least a second electromechanical relay coupled between the control system and the second interface to the first Ethernet network having the first security level, the second electromechanical relay coupled to the processor and configured to disconnect the control system from or couple the control system to the second interface based on a relay control signal received from the processor; and wherein:

when the selected mode is a first mode, the relay configuration corresponds to the first electromechanical relay forming a connection between the codec and the first interface to the first Ethernet network and the second electromechanical relay forming a connection between the control system and the second interface to the first Ethernet network;

when the selected mode is a second mode, the relay configuration corresponds to the first electromechanical relay disconnecting the codec from the first and third interfaces and the second electromechanical relay connecting the control system to the second interface; and when the selected mode is a third mode, the relay configuration corresponds to the first electromechanical relay connecting the codec to the third interface and the second electromechanical relay disconnecting the control system from the second interface.

19. The switching unit of claim 18, wherein the switching unit is disposed within a 1 RU rack space.

20. The switching unit of claim 18, wherein the processor is configured to provide the relay control signals to the relays responsive to an indication from the control system that the codec has been configured in accordance with the selected mode.

* * * * *